United States Patent

[11] 3,575,054

[72] Inventor Edward M. Glista
East Longmeadow, Mass.
[21] Appl. No. 806,586
[22] Filed Mar. 12, 1969
[45] Patented Apr. 13, 1971
[73] Assignee United Aircraft Corporation
East Hartford, Conn.

[54] PRESSURE SENSING DEVICE
5 Claims, 7 Drawing Figs.
[52] U.S. Cl. ............................................. 73/398R
[51] Int. Cl. ............................................. G01l 9/14
[50] Field of Search........................................... 73/398,
407, 410; 336/30; 324/45; 73/407, 398, 410

[56] References Cited
UNITED STATES PATENTS
2,546,657 3/1951 Smoot.......................... 336/30X
2,686,893 8/1954 Markson....................... 336/30X
3,118,108 1/1964 Zoss et al....................... 73/398X
3,162,795 12/1964 Cherniak...................... 336/30X
3,286,528 11/1966 Jullien-Davin ............... 73/398
3,419,798 12/1968 Walton......................... 324/45

Primary Examiner—Louis R. Prince
Assistant Examiner—Daniel M. Yasich
Attorney—Melvin Pearson Williams ABSTRACT: A bellows chamber has directly connected thereto a restoring force coil and Hall field plate position sensing devices which utilize the same DC magnetism as the restoring force coil. DC magnetism may be provided by an annular permanent magnet, and the pressure responsive bellows may be disposed in the annulus of the magnet. One or more Hall devices may be disposed directly on the restoring force coil. In another embodiment, a pair of pressures may be monitored in a device having a bellows chamber for each pressure, the restoring force coil, sensor and magnet relating to one of said bellows being disposed adjacent the other of said bellows, with linkage interconnecting each bellows with corresponding force restoring and sensing devices, thereby providing for mechanical advantage between the force applied by the coil and the force applied to the bellows, so as to reduce the magnetic field requirements and thus the physical size of the device, for a given pressure. In another embodiment, the magnet, restoring coil and sensors may be disposed at the moveable end of a bellows chamber, opposite the pressure inlet. In another embodiment of the invention, a diaphragm may be utilized to define a chamber having a wall displaceable by pressure differentials thereacross, instead of a bellows chamber.

Patented April 13, 1971
3,575,054
3 Sheets-Sheet 1
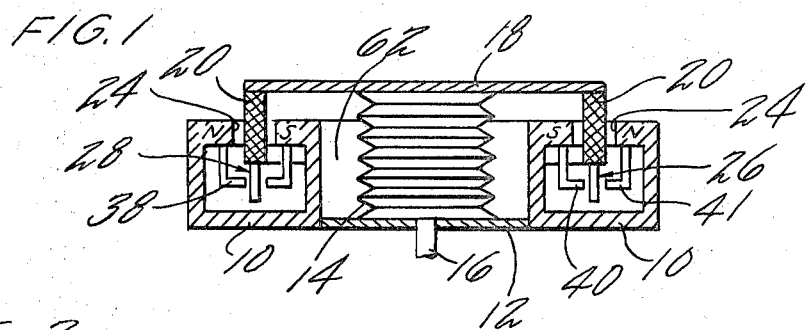
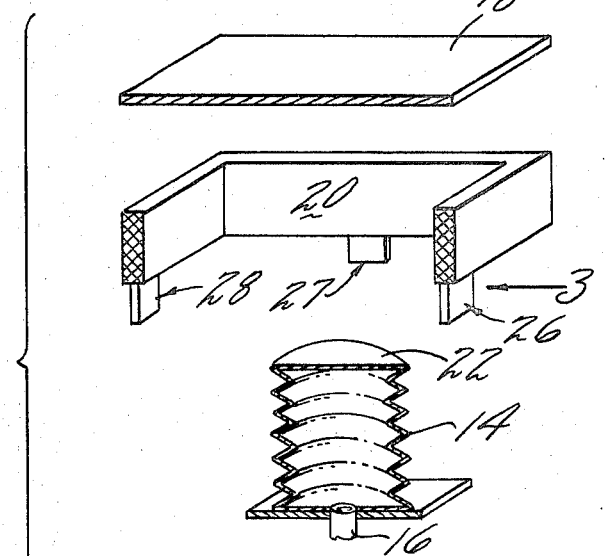
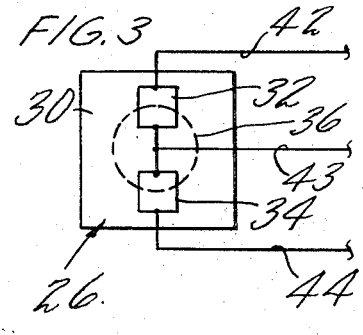
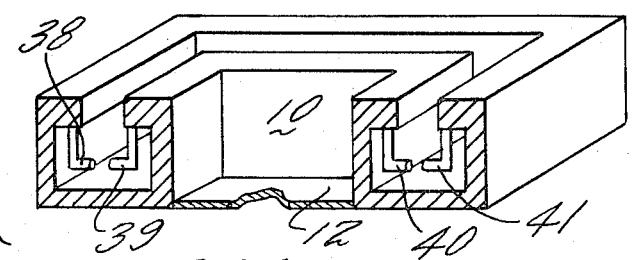
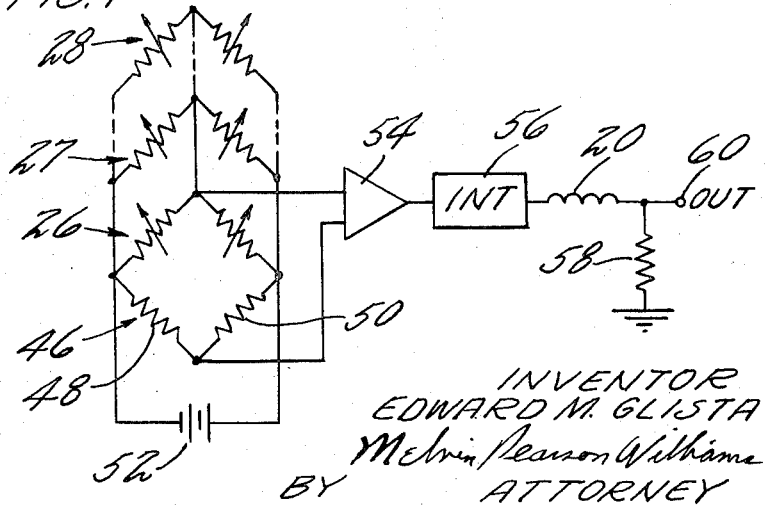
INVENTOR
EDWARD M. GLISTA
Melvin Pearson Williams
BY                ATTORNEY

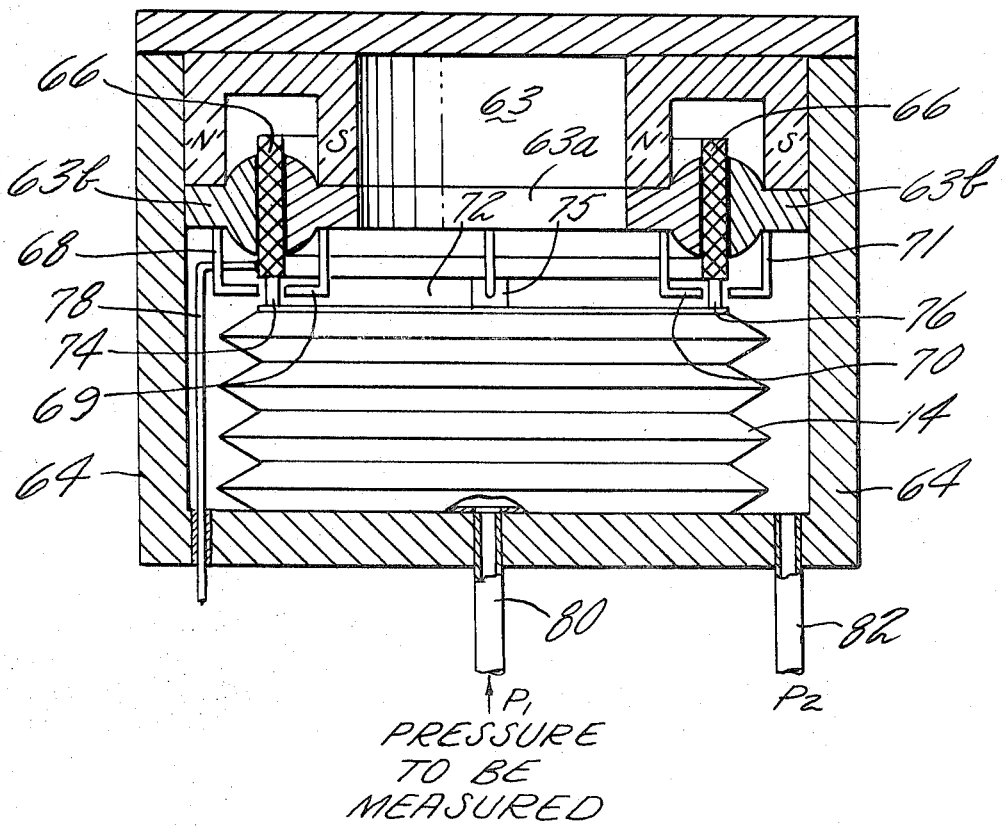
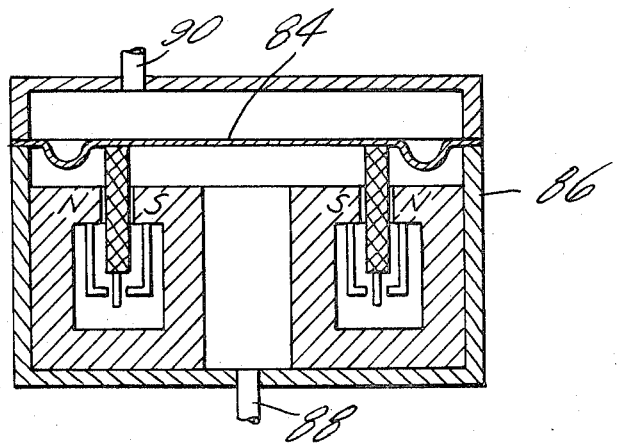

Patented April 13, 1971

PRESSURE SENSING DEVICE

BACKGROUND OF THE INVENTION

1. Field of Invention

This invention relates to pressure transducers, and more particularly to improvements in driving and/or sensing means therefor and physical arrangements thereof.

2. Description of the Prior Art

Pressure sensors known to the prior art typically involve the use of either a bellows chamber or of a diaphragm separating a pair of chambers, between which a pressure differential exists. One may sense absolute pressure by evacuating the chamber externally of the bellows chamber, or one may sense relative pressure by feeding two different pressure sources to opposite sides of the bellows chamber or diaphragm. Such devices typically involve the use of mechanical linkage of some form between the moveable pressure wall (such as one end of the bellows chamber or the diaphragm) and the sensing devices that sense a change in position of the moving wall. Also, it is known to use a restoring force to cause the position of the moving wall to be driven in a direction opposite to the tendency towards motion which results from a pressure differential across the wall. Such devices are sometimes referred to as nulling pressure sensors, and employ linkage to interconnect the restoring force means with the moving wall.

However, such devices known to the art are expensive and cumbersome, and require the use of moving linkage elements which result in friction, shock response, and other disadvantageous characteristics. Also, nulling devices known to the art require complex sensing mechanisms and cumbersome restoring force generators. Additionally, separate electronic (and frequently magnetic) systems are required for the restoring force generators and the sensors. In a number of devices known to the prior art, alternating current flux is required in order to operate either the sensors or the restoring force generators, which precludes the use of simple permanent magnets therefor.

Summary of Invention

The object of the present invention is to provide relatively simple, reliable, compact and inexpensive pressure sensing devices.

According to the present invention, a force restoring armature utilizes the same field as the position sensing mechanism in a pressure sensing device. In accordance with the present invention, the position displacement sensing means is responsive to a steady state magnetic flux field. In accord with the present invention a restoring force coil is disposed in an annular magnetic structure (which can be of a variety of shapes), with the pressure responsive chamber (which may include the walls of the magnetic structure sealed with a diaphragm or a bellows chamber) disposed within the annulus of the magnetic structure. In accordance with the present invention, the force restoring coil of a pressure sensor may be disposed directly on a displaceable element (such as a wall) of a pressure responsive chamber (such as a moveable diaphragm in a chamber or the relatively moveable end of a bellows chamber). In further accord with the present invention, linkage may be utilized to provide a mechanical force advantage to a restoring force means, while maintaining the compact integral structure of the present invention.

BRIEF DESCRIPTION OF THE DRAWINGS

FIG. 1 is a sectioned side elevation of a first embodiment of the present invention;

FIG. 2 is an exploded perspective of the embodiment of FIG. 1;

FIG. 3 is a schematic illustration of a sensor utilized in the embodiment of FIGS. 1 and 2;

FIG. 4 is a simplified schematic diagram of an electric control system for use of the embodiment of FIGS. 1 and 2, employing a plurality of sensors of the type illustrated in FIG. 3;

FIG. 5 is a sectioned side elevation of an alternative embodiment of the present invention;

FIG. 6 is a sectioned side elevation of an embodiment of the invention employing a diaphragm.

DESCRIPTION OF THE PREFERRED EMBODIMENT

Figure 7:
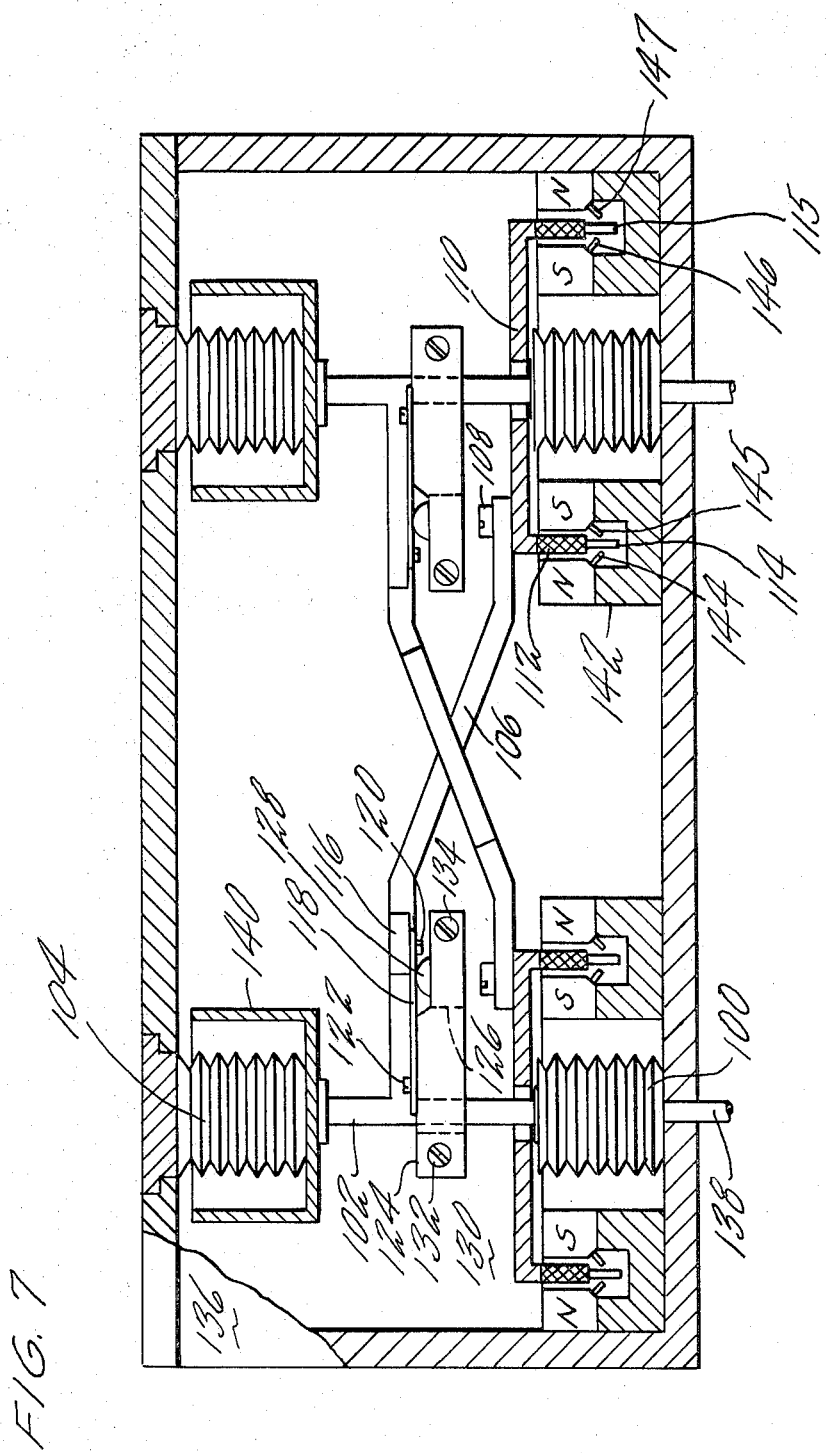
FIG. 7 is a sectioned side elevation of a duplex embodiment of the present invention employing linkage to achieve mechanical advantage.

Referring now to FIGS. 1 and 2, one embodiment of the invention comprises a magnetic structure 10 which may be provided with a nonmagnetic bottom wall 12 to which may be disposed a bellows chamber 14 having an inlet 16 to which a source of fluid pressure may be connected in order to be monitored by the apparatus of the present invention. Disposed at the top of the bellows chamber 14 is a nonmagnetic structural plate 18 to which there is disposed a restoring force coil structure 20 which may comprise essentially an electrical winding of a suitable number of turns potted together in a proper material, such as epoxy, which may also be used to affix the coil 20 to the plate 18. The plate 18 may be bolted or otherwise bonded (such as with a suitable adhesive) to the moveable wall 22 of the bellows chamber 14. The restoring coil 20 is positioned in a slot 24 within the magnetic structure 10; it is positioned relative to the slot 24 by being suitably disposed on the bellows chamber 14, by means of the plate 18. Thus, there is no linkage and no need for any bearings, and no relatively moving contacting surfaces in this embodiment of the invention. Disposed on the restoring coil 20 are one or more sensors 26—28, each of which may comprise, as is known in the art, a ceramic or other insulated substrate 30 (FIG. 3) having a pair of semiconductive chips 32, 34 thereon, referred to as a Hall field plate. The resistance of the chips 32, 34 is dependent upon the strength of magnetic field passing through the chips. A dotted line 36 indicates an ideal flux concentration area which overlaps each of the chips a certain amount. To achieve this, there is a pair of flux concentrating members 38—41 related to each of the Hall sensors 26—28. The flux concentrating members 38—41 tend to provide a relatively well defined area of flux which is delineated by the dotted line 36 in FIG. 3 with respect to the Hall sensor 26.

Each of the Hall sensors 26—28 comprises a pair of variable resistors, with respective leads 42—44 (FIG. 3) connected to the junction between and at the opposite ends of them. They can be connected in parallel as illustrated in FIG. 4 for greater accuracy and insensitivity to vibration. On the other hand, a single Hall sensor (such as sensor 26) could be utilized when its sensitivity is adequate in a given implementation of the present invention. As used herein, the sensors 26—28 comprise one-half of a bridge circuit 46, the other half of which comprises a pair of resistors 48, 50. The junction between the resistors 48, 50 and any of the sensing units 26—28 may have a suitable excitation voltage applied thereto from a source 52 which is indicated herein for simplicity as being a battery. The other junctions of the bridge may be utilized as differential inputs to an amplifier 54, the output of which may be fed to an integrator 56. The output of the integrator 56 can be fed through the restoring force coil 20 and thence through a small precision resistor 58 to ground. The resistor 58 provides a means of deriving an output voltage at a terminal 60 in response to current through the coil 20, the current through the coil 20 being an indication of the force required to restore the position of the sensors 26—28 to a null position in opposition to a change in pressure within the bellows chamber 14.

In operation, parameters are so chosen, in conjunction with the particular configuration of an embodiment of the present invention, that with the pressure inside the bellows 14 equal to the pressure outside the bellows, the sensors 26—28 will each be centrally positioned or nulled with respect to the flux concentrating members 38—41, and there will be no current through the force restoring coil 20. However, with an increase in pressure within the bellows 14, the force restoring coil and sensors tend to rise upwardly as illustrated in FIG. 1, causing a greater amount of flux to fall on one of the chips of the sensors (such as chip 34 in FIG. 3), and a lesser amount on the other (chip 32) thereby increasing the resistance of chip 34 and decreasing the resistance of chip 32. This unbalances the bridge 46 (FIG. 4) thereby causing an input into the amplifier 54 which, when integrated, will cause a current to flow in the restoring force coil 20 of such a magnitude and direction as to cause the coil 20 (together with the sensors) to be pushed downwardly against the force of the bellows 14, thereby returning the sensors to a null flux position (as illustrated in FIG. 3). The current required to balance forces in the system is a linear indication of the amount of force exerted by the bellows as a result of the pressure therein, and therefore an indication of the pressure being measured. This is developed across resistor 58 so as to provide a voltage at the terminal 60 which is directly related to the pressure within the bellows 14.

It should be understood that the space 62 external of the bellows 14 but within the general annulus provided by the magnetic structure 10 may be sealed off and evacuated so as to provide an absolute pressure indication, or it may be properly vented to ambient (as it is in the embodiment shown in FIG. 1) so as to provide an indication of the pressure at the inlet 16 relative to atmospheric pressure. This is all well within the skill of the art.

One of the advantages of the present invention is that the permanent magnet provided by the magnetic structure 10 is not only sufficient to supply a field for the restoring force coil, but it also supplies a suitable magnetic field to operate the sensors. Thus, a single source of passive magnetic force (permanent magnet) is all that is required to operate the device, and power is not required other than to excite and operate the control circuitry (FIG. 4). This circuitry can be located quite remotely from the pressure sensor FIGS. 1 and 2) and only two wires for the sensors and two wires for the restoring coil need be connected to the device. It should be noted that in the embodiment illustrated in FIGS. 1 and 2, the wiring necessary to connect the sensors and the restoring coil with the external circuitry of FIG. 4 has been eliminated for simplicity. However, the wires for the sensors 26—28 could be embedded within the potted structure of the restoring coil 20, and carried outwardly from any convenient point about the coil 20.

A second configuration of the present invention is illustrated in FIG. 5. Therein, the main magnetic structure 63 and the bellows chamber 14 are mounted within a main casing 64 in end-abutting relationship. In this case, the magnetic structure is preferably round and may include an inner pole piece 63a and an outer pole piece 63b. The restoring force coil 66 is therefore also round, which may be preferred in most embodiments because it is easier to manufacture a round coil uniformly than it is a square coil. On the other hand, fabrication of a square magnetic structure 10 is simpler than fabrication of a toroidal magnetic structure 63. The pole pieces 63a, 63b each have a plurality of flux directing members 68—71 which perform the same function as the flux directing members 38—41 of FIGS. 1 and 2. The force restoring coil 66 is disposed to the top of the bellows chamber 14 by a suitable ringlike structure 72 which may comprise just an extension of the epoxy potting material utilized to formulate the restoring coil 66 into a unitary structure. Within the ringlike member 72 may be disposed the Hall sensing units 74—76. Electrical connections to the Hall sensing units 74—76 and the restoring coil 66 may be made by a cable 78 which is lead through the outer wall 64. The wall 64 may have one or two pressure inlets 80, 82 to facilitate utilization of the apparatus as a differential pressure sensor, or by leaving the inlet 82 open to ambient, may be utilized as a pressure sensor with ambient reference. On the other hand, the void between the chamber 14 and the outer wall 64 may be evacuated through the inlet 82 and sealed off as to provide an absolute pressure sensor.

Another embodiment of the present invention, illustrated in FIG. 6, may utilize a diaphragm 84 instead of a bellows chamber 14, the space between the outer wall structure 86 and the bottom of the diaphragm 84 (as viewed in FIG. 6) may comprise a first chamber to which fluid communication may be had through an inlet 88, and the space between the outer wall 86 and the top of the diaphragm 84 (as viewed in FIG. 6) may comprise a second chamber to which fluid communication may be had through an inlet 90. Thus, whether a bellows chamber 14 or a diaphragm 84 is used, there is, in any embodiment of the invention, a pressure chamber having a relatively moveable wall, a tendency toward displacement of which is dependent upon the pressure within the chamber; and, a force restoring means is disposed directly on the relatively moveable wall so as to permit introducing a restoring force which tends to keep the position of the wall constant, the energy required to maintain a constant position being an indication of the pressure against which the restoring force is working and therefore an indication of pressure (or relative or differential pressure) within a chamber including said wall. Of course, the pressure of interest may comprise pressure on either side of the moving wall: that is, it could be the pressure outside of the bellows chamber in FIGS. 1 and 5 or it may be simply the pressure above the diaphragm in FIG. 6. All of this is well within the skill of the art. Thus, all of the embodiments described thus far include restoring force means disposed directly upon the pressure responsive moveable wall of a pressure chamber. The embodiments described thus far also include displacement sensing means responsive to a unilateral force field. These embodiments also commonly employ a single unilateral force field both for establishing a restoring force in conjunction with the restoring coil and for operation of the Hall sensors. The embodiment of FIGS. 1 and 2 has an additional feature of employing a bellows disposed within the annulus of a magnetic structure utilized to provide restoring force to the bellows and utilized to provide magnetic field to the Hall sensors.

Another embodiment of the present invention which includes the features described in the preceding paragraph except for the feature of directly disposing the restoring force means on the moveable wall is illustrated in FIG. 7. Therein, a pair of differential pressure sensors are shown. The pair of differential pressure sensors may typically be utilized so as to provide a pressure ratio sensor, by utilizing appropriate apparatus in addition to the sensors shown in FIG. 7; however, that is not germane to the present invention, which resides in the pressure sensing apparatus per se. One differential pressure sensor comprises a first bellows chamber 100 interconnected by an arm 102 to a second bellows chamber 104. The arm 102 is connected to an arm 106 which is fastened, such as by a screw 108, to a plate 110 to which is disposed a restoring force coil 112 which has position sensing elements 114, 115 disposed thereon. The arm 106 has a pair of tabs, one tab 116 extending outwardly (towards the viewer as seen in FIG. 7), and a similar tab (not shown) extending in the opposite direction (inwardly, away from the viewer as seen in FIG. 7). To the tab 116 there is secured a leaf spring 118, such as by means of a screw 120; the other end of the spring 118 is secured by a screw 122 to a block 124. The block 124 has a slot or hole 126 therein to permit passage of the arm 102 therethrough. The block 124 is also provided with a fulcrum 128 upon which the lower edge of the arm 106 rests. A spring disposed similarly with respect to the spring 118 may be provided on the opposite, hidden side of the arm 106 from the tab similar to tab 116 to a point on the block 124 which is similar to the point of disposition of the screw 122. If, as indicated in the embodiment of FIG. 7, the block 124 comprises a solid block having a hole 126 therein to permit passage of the arm 122, then it may be secured to a rear wall 130 by a pair of screws 132, 134. On the other hand, the block 124 may be fork-shaped so as to be open ended at the left; in that case, the block may be secured both to the rear wall 130 and to a front wall 136 in any suitable fashion, such as by two sets of screws positioned as shown by the screws 132 and 134. The bellows chamber 104 is illustrated herein as being completely sealed, and it is assumed that it is totally evacuated so that the pressure monitored by the apparatus including the two bellows 100, 104 is the absolute pressure of a source connected to the bellows 100 through an inlet 138. The bellows chamber 104 has a dish-shaped member 140 secured thereto so as to prevent complete collapsing of the bellows 104 whenever electrical power is not connected to the apparatus and therefore there is no restoring force provided by the restoring force coil 112. Of course, this feature is discretionary with the designer of any given embodiment of the present invention. The force coil 112 and the sensors 114, 115 are provided unilateral magnetic flux by a generally annular magnetic structure 142 having flux concentration elements 144, 147 disposed thereon, in a manner similar to that described hereinbefore with respect to the embodiment of FIG. 1.

In operation, the leaf springs 118 hold the arm 106 juxtaposed on the fulcrum 128, and with current flowing in the restoring force coil 112 of a magnitude sufficient to overcome the tendency of the bellows chamber 100 to push the arm 102 upwardly against a significantly lesser pressure force in the bellows chamber 104, equilibrium will be established at a central null position, as determined by a flux null across the sensors 114, 115. Considering the effect of a lessening of pressure within the bellows chamber 100, there is a tendency for the bellows chamber 104 and the force provided by the current in the restoring force coil 112 to no longer be matched by the force from the bellows chamber 100, so that the arm 106 will pivot in a counterclockwise direction about the fulcrum 128 to some slight degree. This will cause an unbalance in the sensors 114, 115 and result in a decrease in current in the restoring force coil 112 so that the loss of pressure in the chamber 100 is offset by a lesser force created by the restoring force coil 112. This operation, except for the linkage provided by the arms 102 and 106 is identical to the operation of the embodiment of FIG. 1. However, due to the arrangement of the arm 106 and the fulcrum 128, a mechanical force advantage is provided; for example, at the scale illustrated in FIG. 7, the force coil 112 would only have to provide a force of approximately one fifth of that provided by the pressure difference between the bellows chamber 100 and the bellows chamber 104 in order to achieve incremental equilibrium.

Thus far, with respect to FIG. 7, one complete sensing unit has been described. It should be understood, however, that the bellows chamber 104 need not be utilized in the event where the pressure to be sensed relative to the inlet 138 is not to be a differential or absolute pressure, nor need the bellows 104 be utilized whenever the void between the walls 130, 136 can be utilized to establish a correct pressure basis for the working of the bellows chamber 100. Further, it should be recognized that the bellows chamber 100 is connected by the arm 106 to the force coil 112 and sensors 114, 115 which are disposed within a magnetic structure 142. It is immaterial to this arrangement that there is a bellows chamber disposed within the annulus of the magnetic structure 142. It is also immaterial that the bellows chamber 100 is disposed within the annulus of another magnet which is working with a force coil. However, in terms of practical application of the present invention, one aspect of the invention is the ability of the present invention to capitalize on the compact structural arrangements described with respect to FIG. 1, even when mechanical advantage is desired, thereby rendering the use of a pivoted arm (106) expedient. Thus, two devices (the one described in detail and the other one in FIG. 7) may be disposed side by side each with a long mechanical linkage between various of its parts, with roughly the same compactness of structure as if two independent units of the type illustrated with respect to FIG. 1 were disposed within the same package. The other arm, similar to the arm 106 may be bent so that the two arms do not interfere.

Thus there has been described various embodiments of the invention to bring out various features thereof, as set forth in the summary of invention hereinbefore. It should be understood that various of these features may be utilized in different combinations or singly, while attaining advantage as a result of practicing the present invention. The shapes and configurations have been chosen herein to be illustrative of manners in which the present invention may be embodied physically, but there are, of course, a wide variation in other implementations of apparatus of which may advantageously practice the present invention. Similarly, it should be understood by those skilled in the art that the foregoing and various other changes and omissions in the form and detail may be made in the various preferred embodiments shown and described herein without departing from the spirit and the scope of the invention.

Having thus described typical embodiments of my invention, that which I claim as new and desire to secure by Letters Patent of the United States is:

I claim:

1. A pressure sensor comprising:
    a chamber adapted to be in fluid communication with fluid, the pressure of which is to be indicated by said pressure sensor, said chamber having a wall displaceable in response to variations in pressure within said chamber;
    a source of time-invariant magnetic flux, said source of flux comprising a permanent magnet having a generally annular shape, said chamber being disposed within the annulus of said magnet;
    restoring force means disposed directly on said moveable wall, said restoring force means comprising an electrical coil disposed adjacent said source and within said flux, the current through which is an indication of the force required to maintain said wall in an equilibrium position in opposition to contra forces resulting from changes in the pressure within said chamber;
    position sensing means connected to said wall and operative to provide an indication of displacement of said wall away from a null position, said sensing means comprising a Hall field plate disposed adjacent said source and within said flux;
    and means responsive to said position sensing means and connected to said restoring force means to cause said restoring force means to balance the force applied to said wall by the pressure in said chamber.

2. A pressure sensor comprising:
    a chamber adapted to be in fluid communication with fluid, the pressure of which is to be indicated by said pressure sensor, said chamber having a wall displaceable in response to variations in pressure within said chamber;
    a source of time-invariant magnetic flux;
    restoring force means comprising an electrical coil disposed adjacent said source and within said flux, the current through which is an indication of the force required to maintain said wall in an equilibrium position in opposition to contra forces resulting from the pressure within said chamber;
    position sensing means connected to said wall and disposed adjacent said source and within said flux, said sensing means responsive to said flux to provide an indication of displacement of said wall away from a null position;
    and means responsive to said position sensing means and connected to said restoring force means to cause said restoring force means to balance the force applied to said wall by the pressure in said chamber.

3. A pressure sensor comprising:
    a chamber adapted to be in fluid communication with fluid, the pressure of which is to be indicated by said pressure sensor, said chamber having a wall displaceable in response to variations in pressure within said chamber;
    a source of time-invariant magnetic flux, said source of flux comprising a magnetic structure having a generally annular shape, said chamber being disposed within the annulus of said magnetic structure;

restoring force means comprising an electrical coil disposed adjacent said source and within said flux, the current through which is an indication of the force required to maintain said wall in an equilibrium position in opposition to contra forces resulting from changes in the pressure within said chamber;

position sensing means connected to said wall and operative to provide an indication of displacement of said wall away from a null position;

and means responsive to said position sensing means and connected to said restoring force means to cause said restoring force means to balance the force applied to said wall by the pressure in said chamber.

4. A pressure sensor comprising:

a chamber adapted to be in fluid communication with fluid, the pressure of which is to be indicated by said pressure sensor, said chamber having a wall displaceable in response to variations in pressure within said chamber;

a source of time-invariant magnetic flux, said source of flux comprising a magnetic structure having a generally annular shape, said chamber being disposed within the annulus of said magnetic structure;

electric restoring force means for maintaining said wall in an equilibrium position in opposition to contra forces resulting from changes in the pressure within said chamber, said electric restoring force means being mounted on said wall and cooperating with said magnetic flux;

position sensing means connected to said wall and disposed adjacent said source and within said flux, and operative to provide an electric signal indication of displacement of said wall away from a null position in response to said flux;

and electric means responsive to said position sensing means and connected to said restoring force means to provide an electric signal to cause said restoring force means to balance the force applied to said wall by the pressure in said chamber.

5. A pressure sensor comprising:

a plurality of chambers adapted to be in fluid communication with respective sources of fluid, the pressure of which is to be indicated by said pressure sensor, each of said chambers having a wall displaceable in response to variations in pressure within said chamber;

a plurality of sources of time-invariant magnetic flux, each of said sources of flux comprising a magnetic structure having a generally annular shape, each of said chambers being disposed within the annulus of one of said magnetic structures;

a plurality of restoring force means, each connected to the displaceable wall of a related one of said chambers, each restoring force means comprising an electrical coil disposed adjacent to and within the flux of one of said sources other than the one in which the corresponding one of said walls is disposed, the current through which is an indication of the force required to maintain the related wall in an equilibrium position in opposition to contra forces resulting from changes in the pressure within the related chamber;

a plurality of position sensing means, one connected to each of said displaceable walls and operative to provide an indication of displacement of said wall away from a null position;

and a plurality of means, each responsive to a related one of said position sensing means and connected to a corresponding one of said restoring force means to cause said restoring force means to balance the force applied to the related wall by the pressure in the related chamber.